United States Patent [19]

Pearson et al.

[11] Patent Number: 5,329,539
[45] Date of Patent: Jul. 12, 1994

[54] EFFICIENT LASER CONFIGURATION

[75] Inventors: Leonard P. Pearson, Sunnyvale; Todd E. Olson, Palo Alto; Hop G. Nguyen, Sunnyvale, all of Calif.

[73] Assignee: Lightwave Electronics, Mountain View, Calif.

[21] Appl. No.: 783,532

[22] Filed: Oct. 28, 1991

[51] Int. Cl.[5] .............................................. H01S 3/045
[52] U.S. Cl. .................................................... 372/36
[58] Field of Search ...................................... 372/36, 34

[56] References Cited

U.S. PATENT DOCUMENTS

| | | | |
|---|---|---|---|
| 4,749,842 | 6/1988 | Kane et al. | 219/201 |
| 4,797,896 | 1/1989 | Kane | 372/94 |
| 4,827,485 | 5/1989 | Scerbak et al. | 372/107 |
| 4,829,532 | 5/1989 | Kane | 372/20 |
| 4,947,402 | 8/1989 | Kane | 372/20 |

OTHER PUBLICATIONS

Thomas J. Kane, "Intensity Noise in Diode-Pumped Single-Frequency Nd:YAG Lasers and its Control by Electronic Feedback", *IEEE Photonics Technology Letters*, vol. 2, No. 4 Apr. 1990, pp. 244-245.

*Primary Examiner*—James W. Davie
*Attorney, Agent, or Firm*—John Schipper

[57] ABSTRACT

Compact solid state laser apparatus that includes a laser diode pump, beam forming optics, a laser gain medium and optical resonator, a photodetector to vary the power supplied to the laser diode pump to suppress relaxation oscillations that might otherwise appear in the laser gain medium output light beam, an optical isolator and laser output optics. Each of the optical components has an independently activatable heater to allow optical alignment of that component. Each of the laser diode pump and laser gain medium has an independently activatable thermoelectric cooler to allow optical alignment (laser gain medium only) and to provide thermal tuning of the output wavelength of that device. An optical platform, which is thermally conductive, electrically non-conductive and has low thermal expansion, supports the other components, provides a substrate for electrical traces that provide power for operation of the apparatus and contains the heaters for the optical components.

22 Claims, 4 Drawing Sheets

EFFICIENT LASER CONFIGURATION

FIELD OF THE INVENTION

This invention relates to fabrication of, and efficient packaging for, small solid state laser assemblies.

BACKGROUND OF THE INVENTION

Small solid state laser assemblies have several optical components that require alignment after the assembly components are in place. The optical components are often supported spatially and aligned with six-dimensional fixtures. The components are then frozen into the chosen location and orientation, using a component-holding solder that heats and/or freezes the components in the assigned positions. One method of accomplishing this is disclosed by Kane in U.S. Pat. No. 4,749,842.

The optical, temperature control, beam processing and other components may be small and rugged and often take advantage of known designs. For example, Kane et al, in U.S. Pat. No. 4,578,793, disclose a non-planar ring laser formed by a multi-faceted crystal, such as Nd:YAG. Kane, in U.S. Pat. No. 4,797,896, discloses a non-planar ring laser that is contained in an evacuated chamber to eliminate thermal currents that might detune the crystal. The crystal is thermally tuned by a special heater in thermal contact with the crystal.

Scerbak et al disclose use of an Nd:YAG laser rod that is mechanically supported from the envelope of a laser diode that pumps the laser rod through a gradient index lens, in U.S. Pat. No. 4,827,485. Rotatable wedges in contact with the laser rod allow adjustment of the tilt of the laser rod optical axis. A sheet of piezoelectric material, bonded to a crystalline optical resonator to tune the laser resonant frequency, is disclosed by Kane in U.S. Pat. No. 4,829,532. Kane, in U.S. Pat. No. 4,947,402, discloses optical pumping of a laser gain medium by a semiconductor, where the shape and focus of the light beam produced by the semiconductor are varied by reflection of this light beam by two mirrors before the light beam arrives at and pumps the laser gain medium.

What is needed is a compact laser assembly that (1) makes efficient use of the small space allotted thereto, (2) allows easy and independent alignment of optical components that are part of the assembly, and (3) provides efficient heat sinking and heat sourcing to control the thermal response of the assembly.

SUMMARY OF THE INVENTION

These needs are met by the invention, which in one embodiment provides a laser diode pumping means, beam forming optics, laser gain means, photodetector means and a laser housing. The laser diode pumping means has a heating and cooling module to thermally tune that device. The laser gain means has a heating and cooling module to thermally tune and to optically align that device. The beam forming optics transports a light beam issued by the laser diode means to the laser gain means. The photodetector means takes a small portion of a light beam issued by the laser gain means and adjusts the power received by the laser diode pumping means to suppress the appearance of undesirable oscillations in the laser gain means output light beam and to protect the laser diode pumping means from optical damage. The laser housing includes an optical platform, upon which the other components rest, that is thermally conductive, is electrically non-conductive, has a small thermal expansion and has a small volume, as small as 24 $cm^3$. The interior of the laser housing may be given a modest vacuum or may be filled with a selected gas, such as nitrogen, to suppress thermal convection within the housing interior and to prevent moisture and oxidization build-up on internal surfaces.

DETAILED DESCRIPTION

Figure 1:
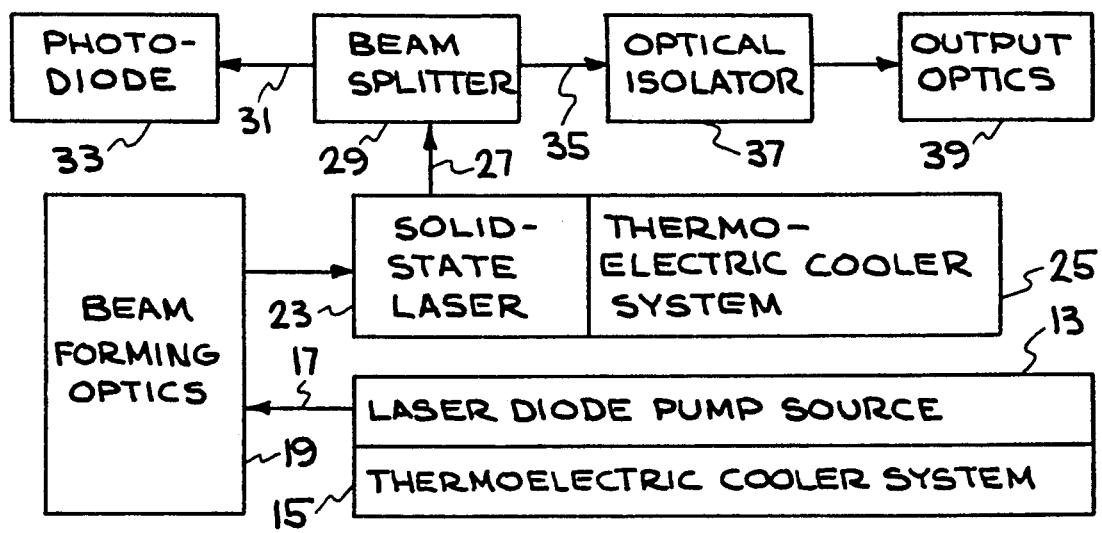
FIG. 1 is a schematic top view of the major component groups used in one embodiment of the invention.

FIG. 1 illustrates the component groups included in one embodiment 11 of the invention, including a pump light source 13, associated temperature control module 15, and pump source light beam focusing optics 19. A pump light beam 17 produced by the pump light source 13 is received and focused by the optics 19 and delivered to a solid state laser gain medium 23, cooled by a thermo-electric cooler system 25, to pump the gain medium and produce a laser output light beam 27. This laser light beam 27 is received by a beam steering module 29 that splits off a small portion 31 of this light beam and directs this portion to a photodetector module 33 for analysis and adjustment of the pump source current to eliminate relaxation oscillations in the laser output beam. This electronic technique is described by Kane in "Intensity Noise in Diode-pumped Single-frequency Nd:YAG Lasers and its Control by Electronic Feedback", I.E.E.E. Photonics Technology Letters, vol. 2 (1990) pp. 244–245, incorporated by reference herein. The remainder 35 of the laser light beam 27, passes through an optical isolator module 37 that orients the light beam polarization and prevents this light beam from returning along a counterpath direction. The laser light beam 35 is then received by a light beam output module 39 that may include one or more optical fibers and associated optics or may include focusing optics and an optically transparent window in a wall of housing (not shown in FIG. 1) that supports and contains the other component groups of this embodiment. The assembly housing includes an optical platform that serves as a support substrate, contains electrical connections to provide power for and to control the other component groups, and serves as a heat sink to dissipate the thermal energy generated by these other component groups. The assembly housing for this embodiment 11 may be as small as 4 cm×3 cm×2 cm, or even smaller if desired.

Figure 2:
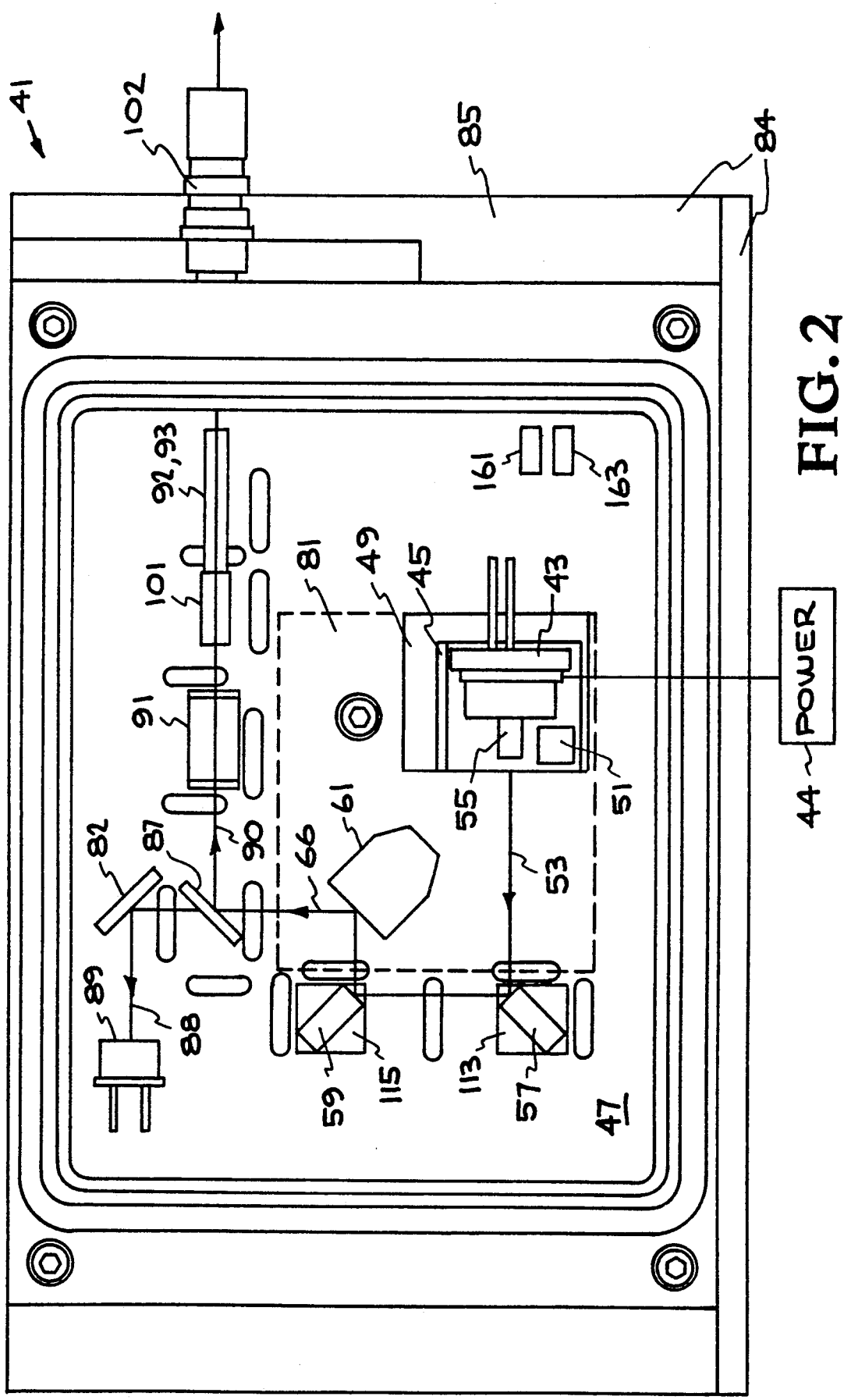
FIG. 2 is a top view of the embodiment of FIG. 1, illustrating details of the component groups.
Figure 3:
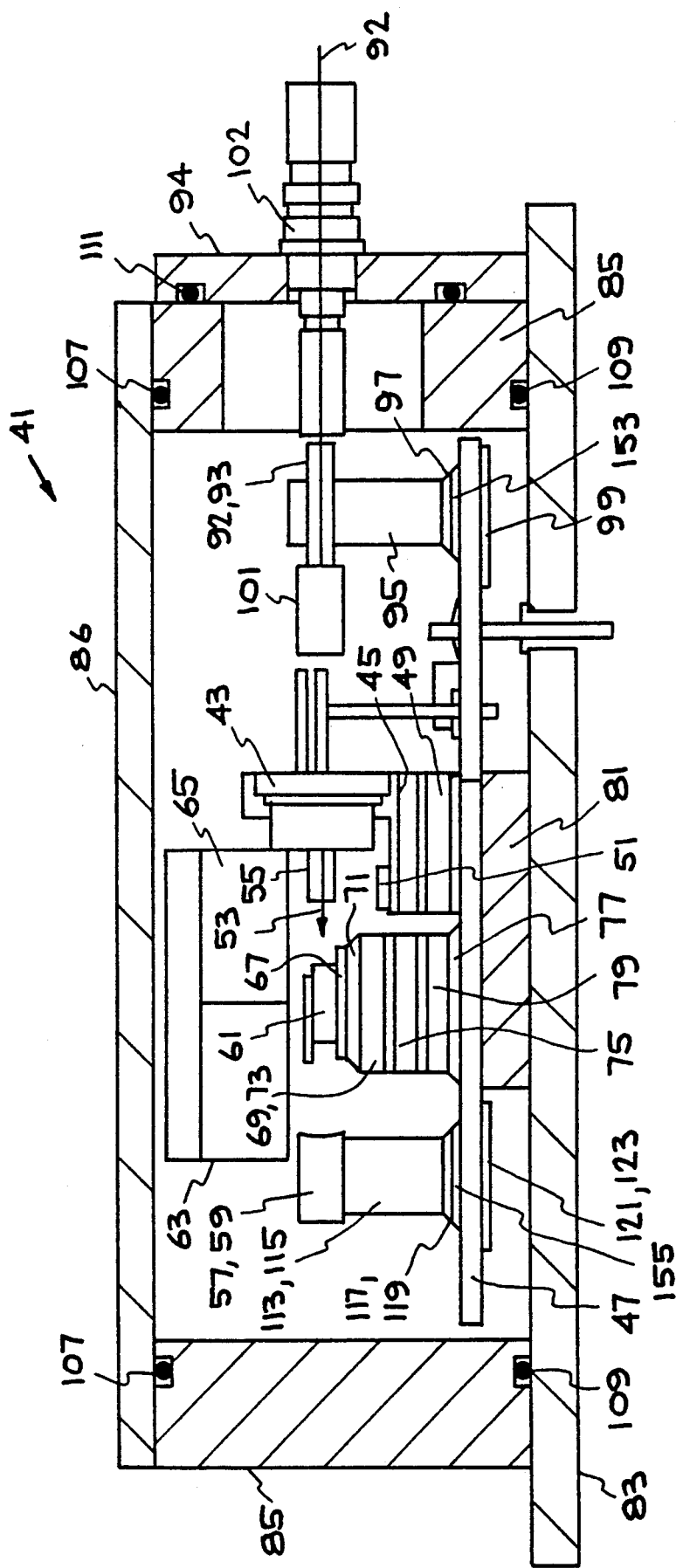
FIG. 3 and 4 are side views of the laser pumping and laser gain medium component groups for the embodiment of FIG. 1 and a second embodiment.

FIGS. 2 and 3 illustrate the embodiment 41 of FIG. 1 in more detail in a top view and a side view, respectively. A laser diode pump 43, such as Sony model SLD 302V that produces 0.2 Watts output at a wavelength of about $\lambda = 0.809$ μm, is driven by a laser diode power supply 44 and is mounted on an L-shaped, thermally conductive carrier bracket 45, which may be made of copper, aluminum or any other suitably conductive material. The carrier bracket 45 is supported on an optical platform 47 by a thermoelectric cooler 49 that thermally tunes the laser diode 43 and maintains this diode at a predetermined temperature. A thermistor module 51 is mounted on the carrier bracket 45 to sense the temperature of the laser diode 43 and to feed this temperature value to the thermoelectric cooler for temperature control purposes.

The laser diode 43 produces a diode light beam 53 that is received and focused by diode optics 55, preferably a SELFOC gradient index rod lens that reduces the diode light beam divergence angle by a numerical factor of F (F=3-10) and directs the diode light beam 53 to a first concave mirror 57 and then to a second concave mirror 59 at non-normal incidence angles. After the diode light beam has been reflected from, and shaped by, the mirrors 57 and 59, this light beam is received by a monolithic, solid state laser gain medium and optical resonator cavity ("resonator") 61. The beam forming optics, including the mirrors 57 and 59, reshape and focus the light beam from the laser diode pump 43 to the resonator 61.

A suitable laser gain medium is Nd:YAG, which issues an output light beam at wavelengths $\lambda = 1.06$ $\mu$m and/or $\lambda = 1.32$ $\mu$m. The preferred optical resonator configuration is described in U.S. Pat. No. 4,578,793 or 4,947,402, both issued to Kane and described above, which are incorporated by reference herein. A pair of permanent magnets 63 and 65 (not shown in FIG. 2 for the sake of clarity) are positioned adjacent to the resonator 61. The magnets 63 and 65 induce a Faraday effect in the resonator 61. The resonator 61 causes the internally generated laser light resulting from the input light beam 53 to traverse a non-planar path within the resonator 61 by total internal reflection from a plurality of facets, and the resonator 61 issues an output light beam 66 at non-normal incidence angle at one of these facets. This causes a phase shift at each reflection within the resonator 61 and induces a partial polarization of this output light beam 66, which polarization is different for clockwise and counter-clockwise propagating light beams. The combined result of the Faraday effect, the phase shifts and partial polarization is a traveling wave light beam that eliminates spatial hole burning so that the output light beam 66 has a single longitudinal mode in a preferred direction. The material for the magnets 63 and 65 may be Nd:boron, available commercially as type Neight No. 28 from I. G. Technology of Valpariso, Ind.

The resonator 61 is mounted inside a thermally conductive resonator cup 67, which may be made of copper, aluminum or some other suitable conductive material, by an ultraviolet curing cement such as NOA 61, made by Norland Products, New Brunswick, N.J. The cup 67 is mounted on a thermally controlled block 69, made of copper or aluminum, with a thick layer 71 of relatively low melt point solder. One suitable solder here is Indalloy 1E, available from Indium Corporation of America, Utica, N.Y. Typically, the thickness of the solder layer 71 might be 0.5 mm. The thermally controlled block 69 is typically 5 mm $\times$ 5 mm square with a thickness of 1.5 mm, and this block has a slotted area therein that surrounds a thermistor 73 to measure and allow control of the temperature of the block 69. The thermally controlled block 69 is mounted on and in thermal communication with a thermoelectric cooler 75 that controls the temperature of the block 69 for thermal tuning of the resonator 61 during operation. The thermoelectric cooler 75 is also used during optical alignment to melt the solder layer 71 that holds the resonator cup 67, to allow alignment of the resonator 61.

The thermoelectric cooler 75 is mounted on the optical platform 47, which underlies and supports all other components shown in FIG. 2, with a layer 77 of low melt point solder such as Indalloy 1E. The resonator 61, the solder layer 71, the thermally controlled block 69 and the thermoelectric cooler 75 rest on a spacer block 79, which is chosen to be of appropriate height so that the resonator 61 receives the light beam 53 issued by the laser diode 43 and reflected by the mirrors 57 and 59. A surface of the optical platform 47 may be given a metallized coating (not shown) to allow the solder layer 77 to more easily adhere to the optical platform 47. The optical platform may be made of alumina ($Al_2O_3$), beryllia (BeO), aluminum nitride (AlN) or other suitable ceramic material and is preferably between 1 and 2 mm thick. A suitable optical platform material should be mechanically rigid, be thermally conductive, be electrically non-conductive and have very low thermal expansion.

As best illustrated in FIG. 3, a heat sink 81, typically of size 25 mm $\times$ 25 mm $\times$ 2 mm thickness and made of copper or aluminum, is positioned contiguous to the optical platform 47 and under the thermoelectric coolers 49 and 75. The heat sink 81 draws away heat generated by the thermoelectric coolers 49 and 75 and may serve as a spacer plate to lift the optical platform 47 off a baseplate 83 that forms part of the housing 84 for the assembly 41. Heater pads for optical alignment (illustrated in FIG. 5B below) of various optical components must be thermally isolated from the baseplate 83. The heat sink 81 thermally and mechanically isolates the optical platform 47 from the baseplate 83. Deformations of housing walls 85, of a housing lid 86, and of the baseplate 83 will have little effect on alignment of the optical elements on the platform 47, because the optical platform 47 is attached to the housing 84 only through the small surface area of the heat sink 81. In particular, the optical platform and the optical components positioned thereon are isolated from the effects of external torque and distortion that may be present in the housing 84.

The resonator 61 receives the diode laser pump light beam 53 and produces and issues a laser light beam 66 that is received by a beamsplitter 87 that splits off a small portion 88 (of the order of a few percent of the energy of the beam 66) for analysis by a photodetector 89. The remainder or output beam 90 of the laser light beam proceeds from the beamsplitter 87 toward an exit point from the laser assembly 41 shown in FIG. 2. The beamsplitter 87 is oriented so that the output beam 90 is received by an optical isolator 91 and then by an optical fiber 92. The optical isolator 91 may be a Faraday effect isolator, such as Model No. NS 01531A, which uses YIG and is available from Namiki Precision Jewel Company, Japan. The Faraday effect associated with YIG is pronounced at wavelengths $\lambda \approx 1.3$ $\mu$m.

The fiber 92 may be contained in and supported by a glass capillary tube 93 of typical length 6.5 mm. The capillary tube 93 may have inside and outside diameters of 0.13 mm and 1.8 mm, respectively, and the fiber 92 is attached to the tube 93 by ultraviolet curing adhesive. The capillary tube 93 is attached by an adhesive, such as 1C White epoxy, to a gold-coated, aluminum capillary tube support mount 95. The support mount 95 is attached to the optical platform 47 by a thick layer 97 of low melt point solder such as Indalloy 1E. A resistive heater 99 is mounted on or incorporated in the optical platform 47 to heat and melt the solder layer 97, thus allowing optical alignment of the fiber 92 and the support mount 95.

The output beam 90 is focused on an end of a fiber 92 by an optional gradient index lens (SELFOC) 101, and this lens is aligned by orienting it for maximum power output from the other end of the fiber 92. The lens 101 may be adhered to one end of a glass capillary tube 93 with an ultraviolet curing adhesive. Additional adhesive, such as 1C White epoxy, can be added around the lens 101 to give the attachment added strength.

The optical fiber 92 passes through a hermetically sealed fiber connector 102, such as AMP Model No. 501003-1 50, that is soldered or otherwise attached to a supplemental housing wall 94 of the laser assembly shown in FIG. 3 and sealed with an O-ring 111. The housing walls 85 of the embodiment 41 are hermetically sealed to the housing baseplate 83 and to the housing lid 86 by means of a plurality of screws and includes a first O-ring 109 (e.g., rubber), positioned between a lip of the walls 85 and the baseplate 83, and a second O-ring ring 107 positioned between a lip of the walls 85 and the lid 86. The baseplate 83, the walls 85 and the lid 86 define an evacuable chamber that houses the remainder of the laser assembly 41. Optionally, this chamber interior may be filled with a nitrogen atmosphere at atmospheric or sub-atmospheric pressure or may be held at a modest vacuum, such as 0.01 Torr. The first concave mirror 57 (and, similarly, the second concave mirror 59) rests upon a spacer block 113, chosen to be of appropriate height so that this mirror receives and reflects the light beam 53 issued by the laser diode 43. The mirrors 57 and 59 are attached to their spacer blocks 113 and 115 by respective layers 117 and 119 of low melt point solder, such as Indalloy 1E, that is heated by independent, adjacent resistive heaters 121 and 123, respectively. The heaters 121 or 123 melt the corresponding solder layer 117 or 119 to allow alignment of the mirror 57 or 59 for proper orientation and focusing. One suitable mirror arrangement is disclosed in U.S. Pat. No. 4,947,402, issued to Kane.

Figure 4:
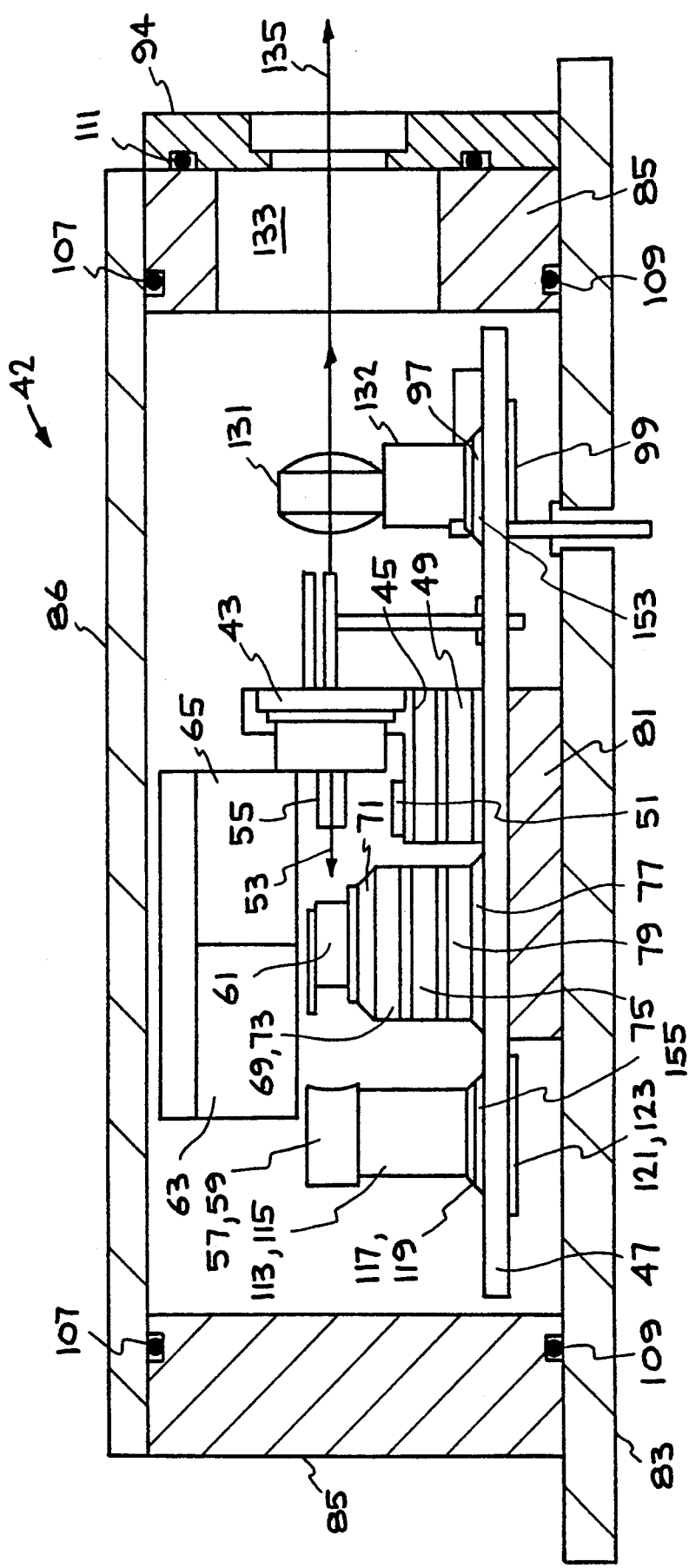

FIG. 4 is a side view illustrating a second embodiment 42 of the invention, in which the optical fiber 92, capillary tube 93, capillary tube support 95 and gradient index lens 101 are removed and the light beam 90 received from the beamsplitter 87 is passed through a lens 131 and through a transparent window 133 in a housing side wall 85. The lens 131 is positioned for optimal focusing and positioning of the output light beam 135 and is mounted on the optical platform 47 in the same manner as is the capillary tube 93.

Figure 5A:
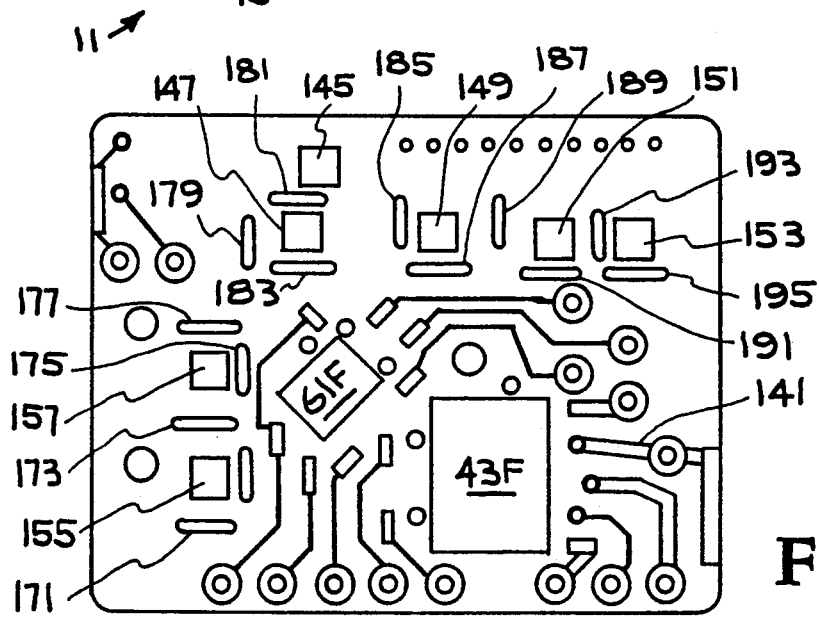
FIGS. 5A and 5B are schematic top and bottom views of an optical platform showing some of the electrical lines that provide power or current for some of the components shown in FIG. 2.
Figure 5B:
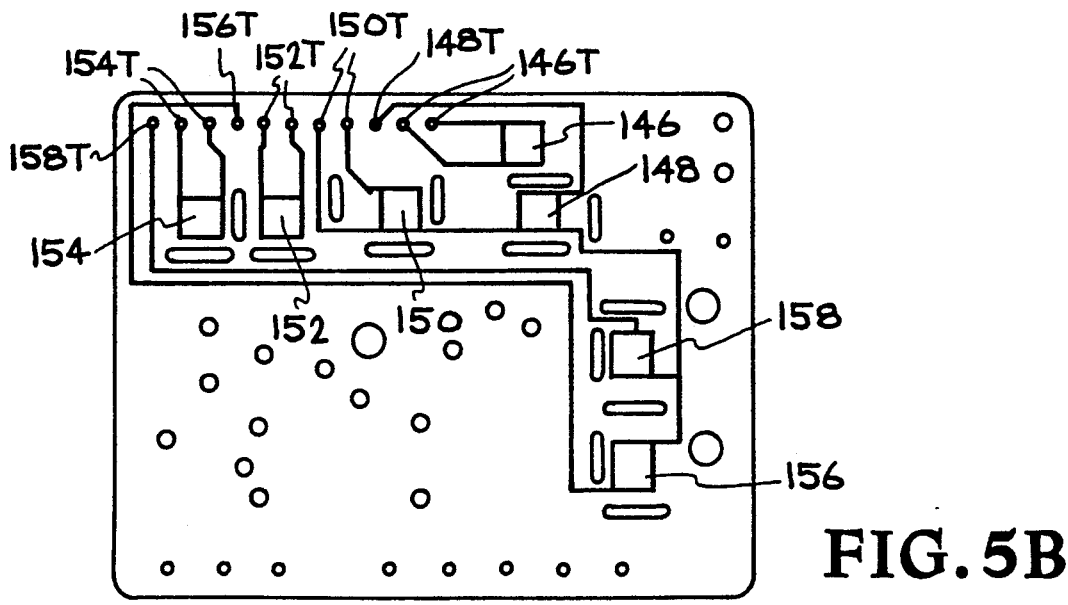

FIGS. 5A and 5B are schematic top and bottom views, respectively, of the optical platform 47, showing electrical traces, such as 141, that provide power and control signals for the components positioned on or adjacent to the optical platform 47. The external power source may provide electrical power at a single voltage, such as 5 Volts, or may provide such power at two or more different voltages. Seven solder pads 145, 147, 149, 151, 153, 155 and 157 appear in FIG. 5A, corresponding to the positions of a photodetector reflection mirror 82, the beamsplitter 87, the optical isolator 91, an optional output lens mount 132, the capillary tube support mount 95, the mirror 57 and the mirror 59, respectively. On the bottom side of the optical platform 47, shown in FIG. 5B, individually controllable resistive heater pads 146, 148, 150, 152, 154, 156 and 158 are positioned immediately below the solder pads 145, 147, 149, 151, 153, 155 and 157, respectively, to heat and soften the respective solder pads for optical alignment of the optical components resting on the respective solder pads. Each of the heater pads 146, 148, 150, 152, 154, 156 and 158 has a pair of independently activatable electrical terminals 146T, 148T, 150T, 152T, 154T, 156T and 158T, respectively, that allow independent activation of the heater pads.

The solder pads and electrical traces 141 shown in FIG. 5A are made of metallic materials, such as a platinum/gold mixture, that is thermally fused to the optical platform 47 by applying a high temperature process used in standard hybrid circuit technology. Such a process is performed commercially by United Supertek of San Jose, Calif. These electrical traces 141 are set down on the top and bottom surfaces of the optical platform 47 to transmit electrical currents, voltages and control signals for operation of the laser assembly 41. The resistive heaters, 146, 148, 150, 152, 154, 156 and 158, are made of electrically resistive material, fused to the optical platform 47 by applying the same high temperature process. The resistance value for a resistive heater is determined by the geometry and the choice of resistive materials, but 30–100 Ohms is a typical range for such resistance value. A diode 161 and resistor 163 are directly connected to the traces 141 that connect to the laser diode 43, to provide protection against damage to the laser diode 43 from electrostatic discharge. Electrical traces 141 formed in this manner are more compact, more reliable and less expensive to manufacture than conventional wiring.

The positions 43F and 61F shown in FIG. 5A designate the positions of the thermoelectric coolers 49 and 75 used to align and/or thermally control the resonator 61 and the laser diode 43, respectively. The thermoelectric cooler 49 serves only to heat or cool, and thus thermally tune, the laser diode 43 to achieve the desired light beam wavelength. The thermoelectric cooler 75 supports a solder layer 77 and is used to thermally tune the resonator 61 and to heat the solder layer 71 for optical alignment of the resonator 61.

Slots or apertures (optical) 171, 173, 175, 177, 179, 181, 183, 185, 187, 189, 191, 193 and 195 are formed in the optical platform 47 to thermally isolate the heater pads 146, 148, 150, 152, 154, 156 and 158 from one another and from the photodetector 89, from the resonator 61 and from the laser diode 43 (FIG. 5B). Each of these slots should have a slot width, viewed from the top, of at least two-thirds of the thickness of the optical platform in order to prevent fracturing of the optical platform 47 adjacent to such slots. The slots can be formed with laser or with carbide or diamond tools.

The optical platform 61 and component arrangement used here has several advantages over existing technology. The optical platform material, preferably alumina or beryllium oxide, is thermally conductive, is electrically non-conductive and has very low thermal expansion. This greatly improves the stability of laser alignment and laser output power. The component arrangement permits the entire apparatus to be packaged in a compact, rugged housing whose volume can range from 24 cm$^3$ to 600 cm$^3$, or even larger. A typical package might be 2 cm high $\times$ 4 cm wide $\times$ 6 cm long.

We claim:

1. Compact solid state laser apparatus comprising:

laser diode pumping means, having an electrical power supply, for producing and issuing a pump light beam of a predetermined output wavelength $\lambda_P$, the laser diode pumping means including a heating module to thermally tune the output wavelength of the laser diode pumping means;

beam forming optics means for receiving the pump light beam and for forming and issuing a reformed light beam having predetermined optical characteristics, the beam forming optics means including a heating module and a region of meltable and solidifiable material in contact with the heating module to allow optical alignment of the beam forming optics means;

laser gain means for receiving the reformed light beam and for producing and issuing a laser gain means output light beam of predetermined output wavelength $\lambda_L$, the laser gain means including a solid state laser gain crystal, an optical resonator, a heating module and a region of meltable and solidifiable material in contact with the heating module to allow optical alignment of the laser gain means and to thermally tune the output wavelength of the laser gain crystal;

photodetector means, electrically connected to the laser diode means, for receiving a predetermined small fraction of the laser gain means output light beam and for adjusting the electrical power supplied to the laser diode pumping means to suppress the appearance of undesirable oscillations in the laser gain means output light beam, the photodetector means including a heating module and a region of meltable and solidifiable material in contact with the heating module to allow optical alignment of the photodetector means; and an optical platform that is mechanically rigid, is thermally conductive, is electrically non-conductive and has low thermal expansion, the optical platform supporting the laser diode pumping means, the beam forming optics means, the laser gain means and the photodetector means.

2. The apparatus of claim 1, further comprising output optics means for receiving a remainder fraction of said laser gain means output light beam that is not received by said photodetector means and for forming and issuing a laser light beam of wavelength $\lambda_L$, the output optics means comprising a heating module and a region of meltable and solidifiable material in contact with the heating module to allow optical alignment of the output optics means.

3. The apparatus of claim 2, wherein said output optics means further comprises:
an optical fiber having a light receiving end for receiving and transmitting a light beam from said laser gain means;
light beam focusing means for receiving said remainder fraction of said laser gain means output light beam not received and for focusing said remainder portion onto the light receiving end of the optical fiber; and
fiber alignment means for aligning the light receiving end of the fiber to receive said remainder portion of said laser gain means output light beam.

4. The apparatus of claim 2, wherein said output optics means further comprises a lens to receive and focus said remainder fraction of said laser gain means output light beam.

5. The apparatus of claim 1, wherein said photodetector means comprises:
a photodetector to receive a light beam, to determine the amount of light present in the received light beam and to compare the amount of light present in the received light beam with a predetermined standard amount of light;
a beamsplitter positioned to receive said laser gain means output light beam, to direct said predetermined small fraction of said output light beam toward the photodetector, and to direct said remainder fraction of said output light beam toward said output optics means; and
light diode adjustment means, connected to the photodetector and to said light diode pumping means power supply, for adjusting said power supply to reduce the difference between the amount of light received by the photodetector and the predetermined standard amount of light.

6. The apparatus of claim 5, wherein each of said photodetector and said beamsplitter has an independently operable heating module and a region of meltable and solidifiable material in contact with the heating module to allow independent optical alignment of said beamsplitter and of said photodetector.

7. The apparatus of claim 1, wherein said laser housing has an interior volume between 24 cm$^3$ and 600 cm$^3$.

8. The apparatus of claim 1, wherein said optical platform is made of a material selected from a group of thermally conductive, electrically non-conductive materials consisting of alumina, beryllia and aluminum nitride.

9. The apparatus of claim 1, wherein said photodetector means comprises:
a beamsplitter to receive said laser gain means output light beam and to divide said output light beam into small fraction and said remainder fraction; and
a photodetector positioned to receive said small fraction of said output light beam from the beamsplitter.

10. The apparatus of claim 1, wherein said heating module of said laser diode pumping means is a thermoelectric cooler.

11. The apparatus of claim 1, wherein said heating module of said laser gain means is a thermoelectric cooler.

12. The apparatus of claim 1, wherein said laser gain crystal comprises a Nd:YAG crystal and said laser gain means output light beam wavelength is approximately 106 $\mu$m.

13. The apparatus of claim 1, wherein said laser gain crystal comprises a Nd:YAG crystal and said laser gain means output light beam wavelength is approximately 1.32 $\mu$m.

14. The apparatus of claim 1, wherein said laser gain means further includes an optical isolator that discriminates in favor of propagation of a light beam therein in a first direction and discriminates against propagation of a light beam therein in a direction opposite to the first direction.

15. The apparatus of claim 1, wherein said heating modules for said beam forming optics means, said laser gain means and said photodetector means are independently operable to allow independent optical alignment of said beam forming optics means, of said laser gain means and of said photodetector means.

16. The apparatus of claim 1, further comprising an evacuable housing containing said laser diode means, said beam forming optics means, said laser gain means, said photodetector means and said optical platform in the housing interior.

17. The apparatus of claim 16, wherein said housing interior is filled with an inert gas to suppress thermal convection within said housing interior.

18. The apparatus of claim 1, wherein said optical platform contains said heating modules and said regions of meltable and solidifiable material for said laser diode pumping means, for said beam forming optics means, for said laser gain means and for said photodetector means and allows independent operation of each of these heating modules.

19. The apparatus of claim 18, further comprising output optics means for receiving a remainder fraction of said laser gain means output light beam that is not received by said photodetector means and for forming and issuing a laser beam of wavelength $\lambda_L$, the output optics means including a heating module and a region of meltable and solidifiable material in contact with the heating module to allow optical alignment of the output optics means.

20. The apparatus of claim 18, wherein said photodetector means comprises:

a photodetector to receive a light beam, to determine the amount of light present in the received light beam and to compare the amount of light present in the received light beam with a predetermined standard amount of light;

a beamsplitter positioned to receive said laser gain means output light beam, to direct said predetermined small fraction of said output light beam toward the photodetector, and to direct said remainder fraction of said output light beam toward said output optics means; and light diode adjustment means, connected to the photodetector and to said light diode pumping means power supply, for adjusting said power supply to reduce the difference between the amount of light received by the photodetector and the predetermined standard amount of light.

21. The apparatus of claim 20, wherein each of said photodetector and said beamsplitter has an independently operable heating module and a region of meltable and solidifiable material in contact with the heating module to allow independent optical alignment of said beamsplitter and of said photodetector.

22. The apparatus of claim 18, wherein said optical platform further contains electrical traces to provide power for said heating modules.

* * * * *